Feb. 28, 1939.  W. P. ZIMMERMAN ET AL  2,149,246
METHOD OF MANUFACTURING HOLLOW GLASS ARTICLES
Filed Oct. 7, 1936
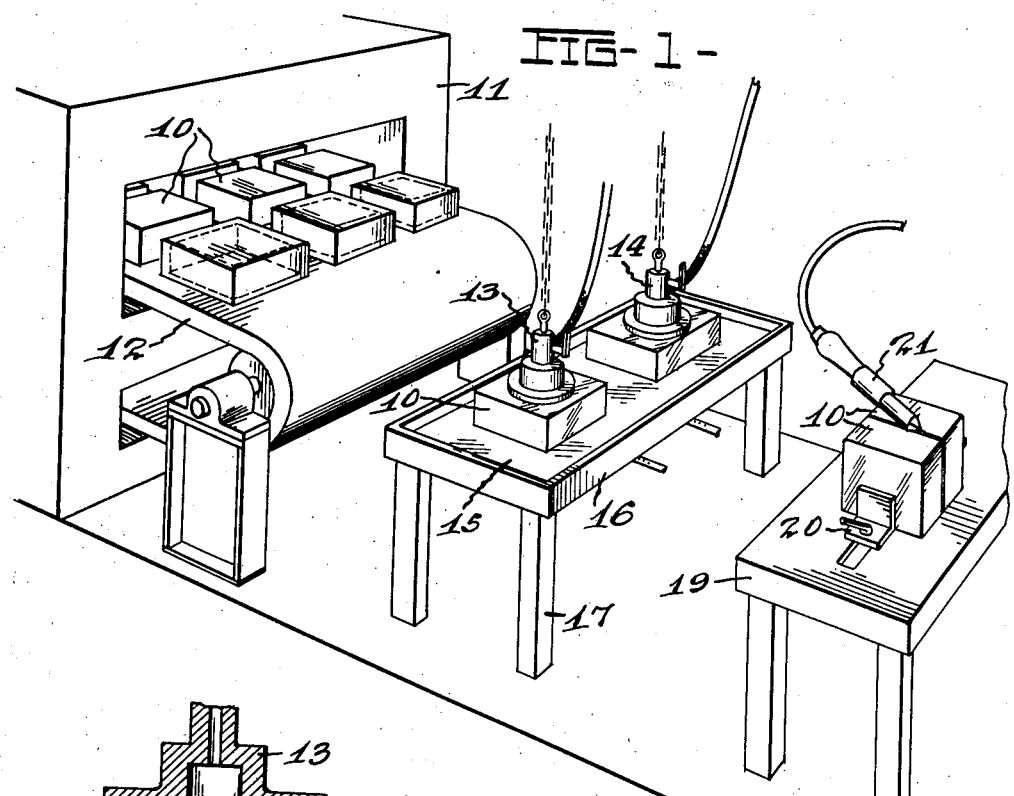
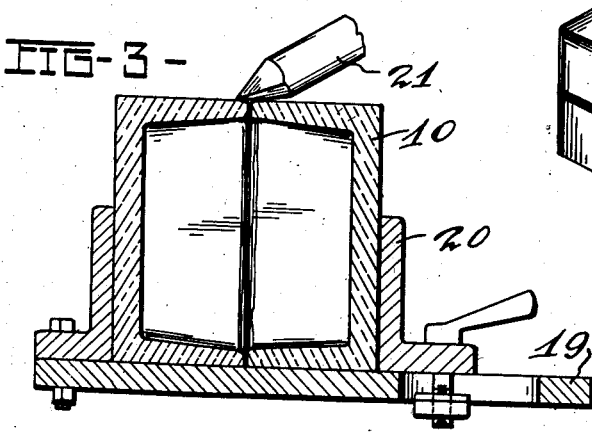
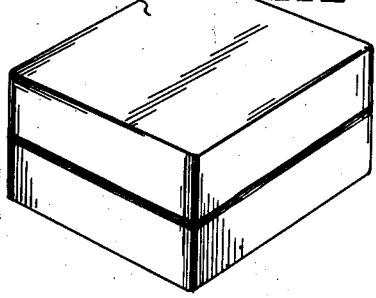
INVENTORS,
W. P. Zimmerman,
M. K. Holmes.
BY Rule & Hoge
ATTORNEYS.

Patented Feb. 28, 1939

2,149,246

UNITED STATES PATENT OFFICE 2,149,246

METHOD OF MANUFACTURING HOLLOW GLASS ARTICLES

Willard P. Zimmerman and Minot K. Holmes, Muncie, Ind., assignors to Owens-Illinois Glass Company, a corporation of Ohio Application October 7, 1936, Serial No. 104,454

3 Claims. (Cl. 49—82)

The present invention relates to a process of manufacturing hollow glass articles and more paricularly to a method of joining together the edge portions of preformed annealed sections of hollow glass building blocks.

The principal object of the invention is to provide a novel and effective means for uniting glass parts in a fashion capable of commercial adaptation.

The apparatus for carrying out the method involved is disclosed in the accompanying drawing in which:

Fig. 1 is a perspective view of an apparatus by means of which the invention is accomplished and illustrating the steps involved in carrying out the method thereof.

Fig. 2 is a vertical sectional view taken through a pneumatic hoisting and handling device employed in connection with the present invention and showing the same in the act of dipping the edge portions of the sections of the article to be united into a pool of molten bonding material.

Fig. 3 is a vertical sectional view taken centrally and longitudinally through an assembly table and through an assembled article operatively positioned thereon; and Fig. 4 is a perspective view of a finished hollow glass building block manufactured in accordance with the principles of the present invention.

While the present method is capable of use in joining together the edges of preformed sections of various forms of glass articles, the invention is described in connection with the joining together of preformed half-sections of hollow hermetically sealed glass blocks. The half-sections 10 are taken from the molds of a forming machine (not shown) in the usual manner and are annealed in an annealing leer 11 from which they issue on a leer conveyor 12 at a temperature considerably below the critical annealing temperature (approximately 800° F.) but sufficiently high that in the next step of dipping the edge portions thereof in a bath of molten solder or bonding material there will be no danger of cracking of these edges.

The half-sections 10 on the conveyor 12 are removed from the conveyor simultanously in pairs by means of a pair of adjacent hoisting and handling devices 13 and 14 and are suspended thereby over a bath of molten aluminum 15, aluminum silicon alloy, or other suitable bonding material which is carried by an open container 16 supported on legs 17 which support the container and molten aluminum at a suitable working level convenient to the operator of the apparatus.

Where blocks having smooth exterior surfaces are undergoing treatment, the handling devices 13 and 14 may be of the vacuum type, and where blocks having irregular exterior surfaces not capable of cooperation with a vacuum hoist are undergoing treatment, other types of handling devices may be employed. Irrespective, however, of the type of handling device employed, the essential features of the method involved are always preserved.

The two half-sections of the block are subsequently lowered to permit the edges and a very small portion of the adjacent side surfaces thereof to project into the bath of molten aluminum. The immersed surfaces of the half-sections are allowed to remain in the bath a sufficient period of time to become reheated to approximately the temperature of the metal and effect adhesion of some of the metal to these sealing surfaces.

The reheated and coated edges of the two half-sections are removed from the molten aluminum bath and, by means of the handling devices 13 and 14, are juxtapositioned on a work table 19 in such a manner that the reheated and coated edges of each section oppose each other. By means of clamping devices 20, the reheated and coated edges of the two half-sections are contacted under pressure to effect permanent adhesion of the two adjacent contacting edges and consequent permanent joining together of the two half-sections of the block.

Excess bonding material is removed from the side surfaces of the block by means of a properly heated soldering iron 2 or other implement, the seam that results is smoothed, and any voids that may occur in the material thereof are filled in and closed.

By means of the above method a vacuumized or partially vacuumized block is produced. Consequently the resistance to creation of internal condensation and thermal conductivity are increased.

Modifications may be resorted to within the spirit and scope of the appended claims.

We claim:

1. The method of producing a hollow glass building block which consists in molding sections having edge portions intended to be bonded together, conveying the sections through an annealing leer, removing the sections from the leer and dipping those edge portions to be united into a molten bath of bonding material prior to any great drop in the temperature of the sections below the critical annealing range to thereby reheat and coat said edge portions, and bringing these edge portions together while the coating is more or less plastic.

2. The method of producing a hollow glass building block which consists in molding sections having edge portions intended to be bonded together, conveying the sections through an annealing leer, removing the sections from the leer and dipping those edge portions to be united into a molten bath of bonding material while the temperature of the block sections is well above room temperature but below the critical annealing range to thereby reheat and coat said edge portions and bringing these coated edge portions together while the coating is more or less plastic.

3. The method of producing a hollow glass building block which consists in molding sections having edge portions intended to be bonded together, conveying the sections through an annealing leer, removing the sections from the leer prior to a temperature drop materially below 800° F., dipping said edge portions into a molten bath of metal having an affinity for glass immediately after removing the sections from the leer and thereby reheating and coating said edge portions and bringing said edge portions together while the coating is more or less plastic.

WILLARD P. ZIMMERMAN.
MINOT K. HOLMES.